Figure 1:
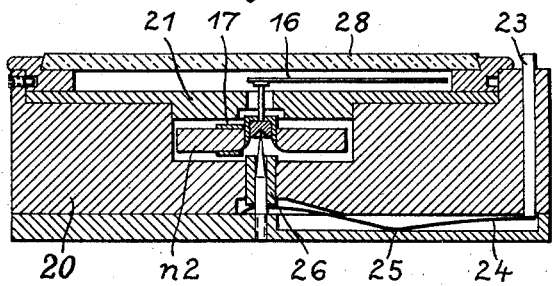

Aug. 23, 1938.   K. MARTIN   2,127,878
MAGNETIC COMPASS
Filed Aug. 25, 1936   2 Sheets-Sheet 1

Inventor: Karl Martin
by Karl Viertel
Attorney

Aug. 23, 1938.                K. MARTIN                2,127,878
                           MAGNETIC COMPASS
             Filed Aug. 25, 1936             2 Sheets-Sheet 2
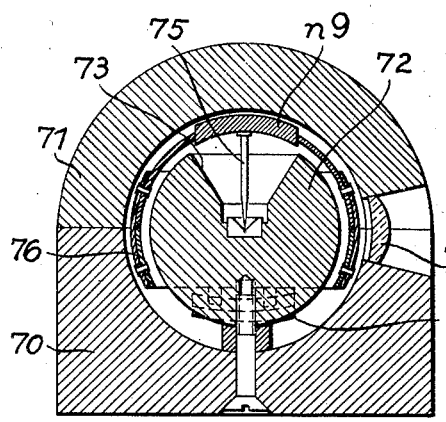
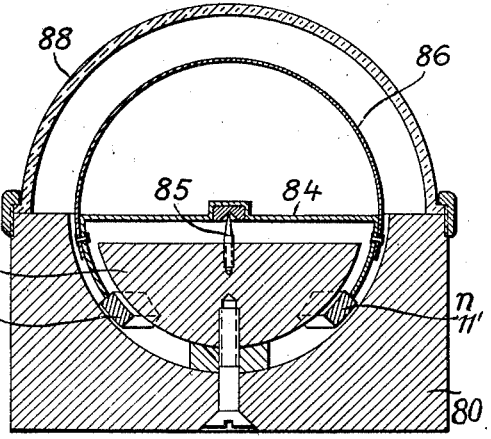
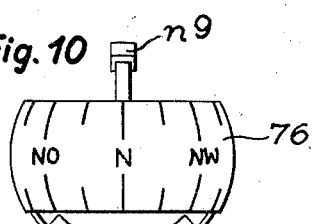
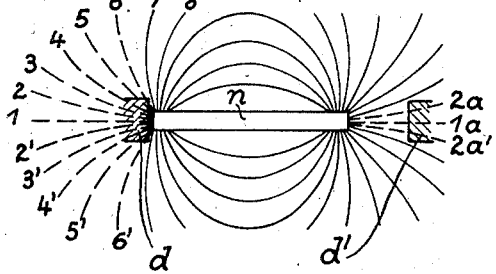
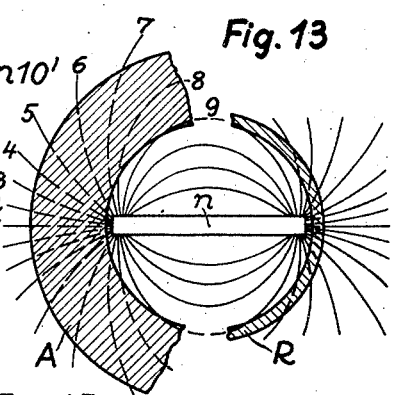
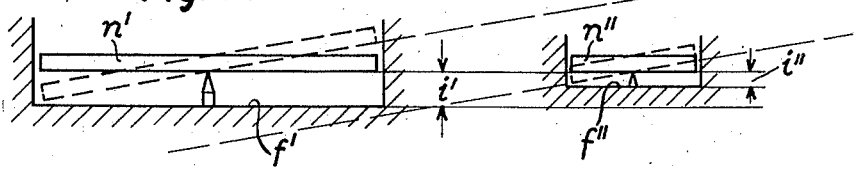
Inventor: Karl Martin
by Karl Viertel
Attorney Patented Aug. 23, 1938

2,127,878

UNITED STATES PATENT OFFICE 2,127,878

MAGNETIC COMPASS

Karl Martin, Rathenow, Germany

Application August 25, 1936, Serial No. 97,752
In Germany September 2, 1935

13 Claims. (Cl. 33—222)

My invention relates to improvements in magnetic compasses of the class, wherein a ring of copper is provided for damping the oscillations of the magnetic needle.

The damping effect of said copper-ring is due to electric eddy currents, produced therein by the magnetic flux, which radiates from the oscillating magnetic needle and passes through said ring, said eddy currents in turn re-producing magnetic energy opopsed to that of the needle and tending to retard the latter.

The gist of this invention, the objects aimed at, and the advantages obtained will be better understood in the light of the prior art, of which first a brief synopsis is herewith given.

Magnetic compasses having a copper-ring, namely a dry damping element, are distinguished from those containing a liquid damping medium by their greater simplicity of construction, their insensitiveness to changes of temperature and their lower price. Copper was chosen as material for the damping rings because of being one of the best conductors of electricity, and the damping rings were made rather thin in order to keep the weight and price of the compass low.

Usually a flat copper ring was placed underneath the poles of the magnetic needle, at a considerable distance therefrom.

Some years ago another type of magnetic compass had become known having two flat copper rings as damping elements, which are spaced from each other, and are associated with the needle in what may be called "saturnian" disposition, namely so as to snugly surround the circular field of action of the needle with ample play therebetween.

In the course of his research work the inventor has found that damping effect of copper-rings of that description is not powerful enough to shorten the retardation period—ending when the magnetized needle has come to rest—to such an extent as nowadays needed in practice, and compasses so equipped cannot be relied upon for so speedy and immediate service as required for instance on board of aircraft, such as aeroplanes, Zeppelin air ships, gliders without engines, etc., in aerial warfare and on other occasions, where expedition—prompt orientation, instantaneous reading of the bearing and immediate correction of the course—at a moment's notice are of paramount importance, sometimes a matter of life or death.

In more recent times it has been proposed to associate the magnetic needle with a copper-ring arranged in upright position around the field of action of the magnetic needle, as seen in United States Patent 2,003,179. According to the teaching in the latter the damping effect is increased by using a magnetic needle of normal length, of which the central section is made of a special alloy steel of high permeability, capable of being relatively easily machined, while the end sections of the needle, made in the form of bars, are of different alloy steel, unfit for being machined and having a high coercive force,—and by forming the central section of said composite needle with tubular portions partly or wholly surrounding the said magnetic bars, so as to concentrate the magnetic flux at the poles of the needle and to minimize leakage or stray flux.

This invention tackles the same problem dealt with in the cited publication, namely of more effectively damping the oscillations of the magnetic needle in compasses of the "dry" class described, but from a different angle. Whereas formerly the better results were expected from improvements in the movable part of the compass—the needle—the inventor has concentrated his efforts in obtaining a higher damping effect from the stationary part of the compass; improvements in the copper-ring.

In connection with a higher damping effect the invention further aims at making compasses of the "dry" class concerned more universally useful in a wider field of applications, including scouting, surveying, and more especially in navigation and aeronautics, where the compass is subject to be tilted through very large angles of inclination as in climbing, turning, diving, etc., and must continue to give reliable service even under adverse conditions.

Still other objects aimed at by the invention will become apparent as the description proceeds.

Figure 2:
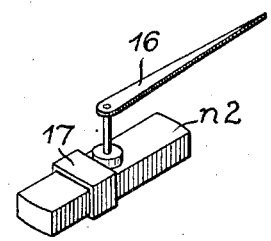
Figure 3:
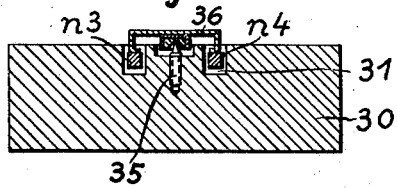
Figure 4:
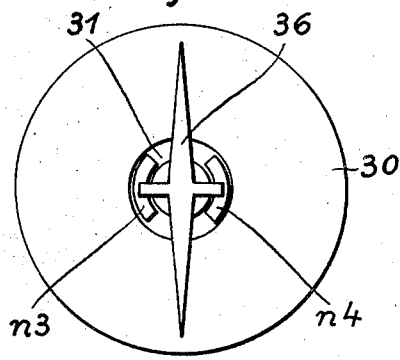

The nature and scope of the invention are briefly outlined in the appended claims and will be more fully understood from the following specification taken together with the accompanying drawings, in which a few embodiments of the invention are shown by way of examples:

Fig. 1 is a cross section through a compass redesigned according to this invention, Fig. 2 shows perspectively a magnetic bar of relatively short length as used in compasses of the type shown in Fig. 1, Figs. 3 and 4 show a compass of modified design, the needle of which consists of two magnetic bars, Figs. 5–8 show compasses, adapted to be tilted through a larger angle of inclination than permissible in the compasses shown in Figs. 1–4;

Figs. 9–11 show other structurally modified types of compasses designed according to this invention and adapted to safely work under still large angles of inclination, Figs. 12–15 are diagrams elucidating the salient ideas underlying this invention by comparison with the drawbacks inherent to known compasses of the class concerned.

In the course of comparative experiments carried out by the inventor it has been found, that the total period of time consumed in damping the oscillations of the compass needle, viz., until the latter arrived in its steady position was considerably shorter, whenever instead of a slender copper-ring a thick mass or stout annulus of non-magnetic, electrically conducting material such as aluminium amply proportioned and closely surrounding the field of action of the needle was arranged as near as practically possible to the latter, namely as consistent with its freedom of movement.

The inventor attributes the higher damping power observed to the fact, that a much larger proportion of electromagnetically active lines of force radiating from the magnetic needle and flowing back thereto in closed cycles pass through said aluminium annulus and will produce therein stronger eddy currents, than in a thin copper-ring, which eddy currents in turn will develop torques of greater retarding power reacting upon the needle.

This explanation will be still better understood by reviewing the phenomena shown in Figs. 12 and 13 of the drawings:

It will be seen in Fig. 12 at the left, that a relatively larger number of magnetic lines of force radiating from the needle $n$ and being indicated by dash lines 1, 2, 3, 4, 5, 6 and 2', 3', 4', 5', 6', eleven in all, are entering the damping member $d$, the front face of which being in closest vicinity to the magnetic needle, while the damping member $d'$ at the right, being of equal size but further apart from the needle, catches only three magnetic lines of force in all: 1a, 2a, 2a'.

However it appears from the inventor's investigations, that the increase of damping power is not simply conditional on the greater number of magnetic lines of force entering the damping member, but is mainly due to its greater volume, viz., the larger size of those cross sectional areas, which are exposed to the whole bunch of cycles of force circulating all around the magnetic needle; in other words: The damping power grows in proportion to the actual length of travel of the magnetic lines of forces passing through the damping member in cycles as long, extensive and complete as possible.

This condition is evidently fulfilled to a much larger extent by a thick mass or stout annulus A, seen in Fig. 13 at the left, where the lines of force passing therethrough are indicated by dash lines or another amply proportioned damping member—than in a slender ring R, seen at the right of Fig. 13. The cross sectional area covered by the lines of force in the annulus A and their lengths of travel therethrough evidently largely exceed those in the ring R.

The inventor's research work carried out with damping members of different metals, more or less conductive to electricity than copper, have revealed, that the best results—both from technical and economical points of view—are obtainable with damping members, structurally redesigned as indicated and made of non-alloyed aluminium of high purity, distinguished from customary alloyed aluminium offered in the trade by the absence of foreign substances, of internal stresses, irregularities of structure and like complexities generally imparted to the material in the course of drawing, rolling, forging, and other shaping operations.

With the objects in view stated above it is proposed to provide magnetic compasses re-designed according to this invention, with:

(1) An amply proportioned damping member, which is made of a non-magnetic metal preferably having a specific weight below 3 and a conductivity above 33 standard units, (1:mOhm) which surrounds the magnetic needle as closely and completely as practically possible with regard to the freedom of its oscillating movements in horizontal and vertical direction, and which is cooperatively associated.

(2) A magnetic needle of unusually short length, when compared with the diameter of the compass card or the overall diameter of the compass proper, and which is preferably made of magnetic material, having a relatively high coercive force exceeding 300 gilberts as found for example in cobalt steel alloys containing about 40–45 percent cobalt.

In the course of the inventor's experiments, directed to solve also the problem of adapting magnetic compasses, which are distinguished by their more powerful damping member closely surrounding the needle, to larger fields of usefulness, including aerial navigation,—where the compass must continue to safely work under large angles of inclination—exceeding 20 or more degrees—it has been found, that the damping member can be placed to advantage with its working faces opposed to the magnetic needle in close vicinity thereto, if:

(1) The needle is shorter than usual, and (2) The loss of directing power entailed by the smaller leverage of the earth's magnetism upon the shorter needle is made up by a larger torque imparted to the needle, namely produced therein by steel of higher coercive force, of which the shorter needle is made.

As referred to above it is true, that composite needles for compasses are known the end portions of which consist of alloy steel of high coercive force, no broad claim is made for the general application of such steels in magnetic compasses except for needles or equivalent directing members proportioned and associated as stated above with a damping member of the improved design and arrangement described.

Another advantageous feature connected with the shorter length of the magnetic needle and aiding in damping its oscillations within a shorter period of time is its reduced pendulum length, namely the smaller moment of inertia acting upon the needle and resulting from the fact, that the centers of gravity of both legs of the needle are nearer to its pivot than with composite and other needles of normal length known heretofore.

The inventor's efforts concerning the proposed arrangement of the damping member as closely as possible to the body—and including the upper and lower face—of the magnetic needle will be more fully understood by reviewing Figs. 14 and 15 of the drawings:

Fig. 14 shows a relatively long needle $n'$ capable of oscillation also in vertical direction through angles of inclination up to about 20°; in order to clear the needle the opposed face $f'$ of the damping member underneath must be kept at a considerable distance from the needle, indicated at $i'$, whereas with a compass having a shorter needle $n''$, shown in Fig. 15 and being adapted to be tilted also through angles up to about 20°, the corresponding distance $i''$ of the opposed face $f''$ of the damping member is evidently much smaller than $i'$, which means that its damping effect upon the needle $n''$ is proportionately higher, as explained hereinbefore with reference to Figs. 12 and 13.

The various improvements referred to above are exhibited in the embodiments of the invention shown by way of examples in the drawings, wherein:

Figs. 1 and 2 show a compass, designed for scouting, surveying and kindred fields of application, namely for giving reliable and speedy service, even on being carried in the user's hand, and which comprises:

(1) A needle $n2$, made in the form of a rather stout magnetic bar of relatively short length, the latter carrying a pointer or indicator 16 and a balance weight 17, and having arcuate end faces, (2) A damping member closely surrounding the needle adjacent the upper and lower and end faces thereof, and being made in two pieces, namely consisting of a rather thick base plate 20 formed with a circular recess or chamber, and of a lid 21 having a central aperture and being nested within plate 20, (3) A protective cover 28 composed of glass or other transparent material, and (4) A locking and releasing device comprising a trigger 23, a resilient two-armed lever 24, fulcrumed at 25 and a sleeve 26 adapted to be lifted and lowered by said lever and in turn to engage and disengage the magnetic needle $n2$.

Figs. 3 and 4 show the main parts of a compass of similar type, namely (1) Its needle, which consists of two arc shaped magnet $n3$, $n4$, in spaced relation to each other, (2) A pointer 36, pivotally supported by a pin 35 and carrying said magnets $n3$, $n4$.

(3) A thick damping member 30 formed with an annular chamber or groove 31, the walls of the latter enclosing the said magnets $n3$, $n4$ from both sides and at the bottom, and being in close proximity thereto throughout their length.

In both types of compasses, shown in Figs. 1 to 4 a compass card or rose (not shown) is provided on top of the damping member, or a division into degrees may be directly engraved into the latter.

Figure 5:
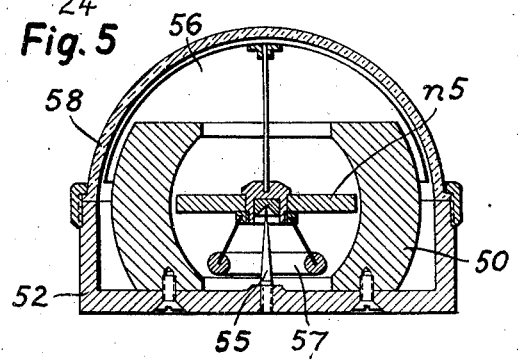
Figure 6:
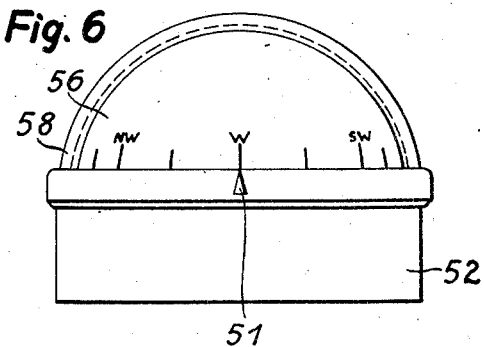

Figs. 5 and 6 show a compass of a different type, adapted to work under larger angles of inclination and comprising:

(1) A compass bowl 52, (2) A damping member 50 made in the form of a hollow calotte or segment of a sphere, amply proportioned as to the thickness of its walls and mounted within said compass bowl, (3) A needle in the form of a stout magnetic bar $n5$ pivotally supported by a pin 55 in the center of said damping member and having its ends in close proximity to the spherical walls thereof, said bar carrying in elevated position a hemispherical compass card 56, the weight of which being counterbalanced by a counterweight 57, (4) A protective cover 58 of transparent material mounted on said bowl 52, the latter being provided with an index mark 51 for cooperation with the graduations of compass card 56.

Figure 7:
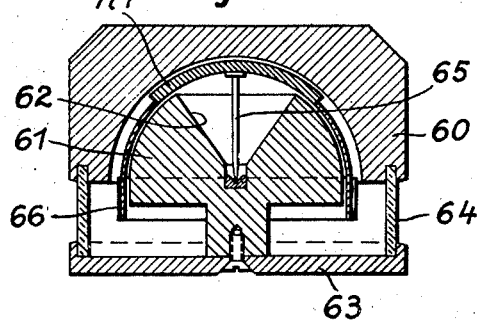
Figure 8:
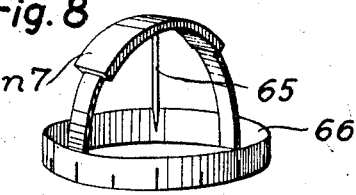

Figs. 7-8 show a compass of kindred type comprising:

(1) A compass bowl 63, the upper section 64 of which is of transparent material and is provided with an index mark (not shown), (2) A damping member consisting of a female part 60, mounted on said bowl and being formed with a hemispherical recess or chamber, and of a hemispherical male part 61, concentrically arranged to the female part at a short distance therefrom and being formed with a conical recess 62 at its upper end, (3) a compass needle in the form of an arc shaped magnetic bar $n7$ pivotally supported in elevated position by a pin 65, so as to oscillate freely about the center of and in the space between the spherical surfaces of the damping members 60, 61, said bar lying in close proximity throughout its length to at least one of said spherical surfaces, and carrying a ring shaped compass rose 66, which acts as a stabilizing member.

In Figs. 9 and 10 a magnetic compass of modified design adapted to work under relatively large angles of inclination is shown, which comprises:

(1) A damping member consisting of three parts, namely a lower part 70, an upper part 71, which jointly enclose a spherical chamber, and which are formed with a window closed by a lens 74, while the third part 72 is spherically formed and concentrically arranged to its mates 70—71 at a distance from their inner walls, (2) A compass needle consisting of three portions, namely an arc shaped upper magnet $n9$, which is pivotally supported in elevated position by a pin 75 in the center of damping member 72, the latter being provided with a conical recess 73 for this purpose, and two arc shaped lower magnets $n10$, $n10'$, which are suspended from the upper magnet $n9$ in symmetric position to the latter, namely being two-dimensionally curved so as to present sections of a globe jointly with magnet $n9$, and to freely oscillate in the globular gap enclosed by the damping member, as in Fig. 1, a mass of electrically conducting material is disposed in close proximity to opposite faces of the magnetic needle members, and as in Figs. 3, 4, 7 and 8, this electrically conducting material lies on both the inner and outer arcuate faces of said members.

(3) A compass card 76 of calotte shape structurally associated with the upper and lower magnets $n9$, $n10$, $n10'$, so as to form one unit therewith and so arranged as to be visible through lens 74 (Fig. 9).

Various other changes and modifications may be conveniently made in the structural details of magnetic compasses, re-designed and showing the improvements described hereinbefore, without substantially departing from the spirit of the salient ideas of this invention.

In Fig. 11 another structurally modified compass is shown, which comprises:

(1) A damping member made in two parts, namely a base 80 formed with a hemispherical recess or chamber and serving as compass bowl, and a calotte 81 concentrically mounted within base 80 at a distance therefrom, (2) A needle member comprising two arc shaped magnets $n11$, $n11'$, which are two-dimensionally curved. As in Figs. 3, 4, 9 and 10, these magnets lie in close proximity to the damping material throughout their length, and on both the inner and outer arcuate faces thereof.

(3) A carrier 84, which is pivotally supported by a pin 85 in the center of the base 80 and calotte 81, and from which said magnets are suspended, the latter being free to oscillate in the globular gap between base 80 and calotte 81.

(4) A hemispherical compass card 86 attached to said carrier 84, and (5) A cover 88 of transparent material mounted on base 80.

In all the compasses shown the respective damping members, designed and arranged as described, are preferably made of soft, pure aluminium or another inexpensive metal having a specific weight below 3 and a conductivity exceeding 33 c. g. s. units—(1:milli-ohm) per square millimeter,—while the magnet or magnets, of which the needle member consists, are made of alloy steel having a coercive force exceeding 300 gilberts or the equivalent in oersted units of measurement.

What I claim is:

1. In a magnetic compass, the combination with a mass of non-magnetic electrically conducting material having a chamber with curved walls formed therein, of a magnetic needle member pivotally mounted to oscillate freely within said chamber, the ends of said needle member conforming with and being disposed in close proximity to the curved walls thereof, said mass of material having a thickness equal to a substantial portion of the length of the needle member and said needle member being of relatively large cross section as compared with its length, and a direction indicating element rigidly attached to said needle member and movable therewith.

2. In a magnetic compass, the combination with a mass of non-magnetic electrically conducting material having a chamber with curved walls formed therein, of a magnetic needle member pivotally mounted to oscillate freely within said chamber and having an arcuate face conforming with and disposed in close proximity to the curved walls thereof, said mass of material having a thickness equal to a substantial portion of the length of the needle member and said needle member being of relatively large cross section as compared with its length, and a direction indicating element rigidly attached to said needle member and movable therewith.

3. In a magnetic compass, the combination with a mass of non-magnetic electrically conducting material having a chamber with curved walls formed therein, of a magnetic needle member pivotally mounted to oscillate freely within said chamber and having an arcuate face conforming with and disposed in close proximity to the curved walls thereof, said mass of material having a thickness equal to a substantial portion of the length of the needle member and said needle member being of relatively large cross section as compared with its length, and a direction indicating element rigidly attached to said needle member and movable therewith, said direction indicating element being located outside of said chamber.

4. In a magnetic compass, the combination with a needle member, of a mass of non-magnetic electrically conducting material provided with a chamber having walls conforming with a portion of the surface of a sphere, and means for pivotally supporting said needle member for universal oscillatory movement about a point substantially at the center of said sphere, with its end portions in close proximity to said surface.

5. In a magnetic compass, the combination with a needle member, of a mass of non-magnetic electrically conducting material provided with a chamber having walls conforming with a portion of the surface of a sphere, means for pivotally supporting said needle member for universal oscillatory movement about a point substantially at the center of said sphere, with its end portions in close proximity to said surface, and an arcuate direction indicating element rigid with said needle member.

6. In a magnetic compass, the combination with a needle member, of a mass of non-magnetic electrically conducting material provided with a chamber having walls conforming with a portion of the surface of a sphere, means for pivotally supporting said needle member for universal oscillatory movement about a point substantially at the center of said sphere, with its end portions in close proximity to said surface; and a direction indicating element rigid with said needle member and shaped to conform with a portion of the surface of a sphere.

7. In a magnetic compass, the combination with an arcuate needle member, and means for supporting it for free oscillation, of a mass of non-magnetic electrically conducting material disposed on both the inside and outside of said arcuate needle member in close proximity thereto.

8. In a magnetic compass, the combination with an arcuate needle member, and means for supporting it for free oscillation, of a mass of non-magnetic electrically conducting material disposed on both the inside and outside of said arcuate needle member, the said material on at least one side being in close proximity to said needle member throughout its length.

9. In a magnetic compass, the combination with a substantially arcuate needle member, of a mass of non-magnetic electrically conducting material provided with a chamber having walls conforming with a portion of the surface of a sphere of substantially the same curvature as that of said needle member, and means for pivotally supporting said needle member for universal oscillatory movement about a point substantially at the center of said sphere, with its curved surface in close proximity to the said spherical surface throughout its length.

10. In a magnetic compass, the combination with a substantially arcuate needle member, of a mass of non-magnetic electrically conducting material provided with a chamber having walls conforming with a portion of the surface of a sphere of substantially the same curvature as that of said needle member, a second mass of electrically conducting material also having walls conforming with a portion of the surface of a sphere, and mounted concentrically within and spaced from the surface of said first mass, and means for pivotally supporting said needle member for universal oscillation within the space between the spherical surfaces of said two masses of conducting material.

11. In a magnetic compass, the combination with a needle member and means for pivotally supporting it for free oscillation, of masses of non-magnetic electrically conducting material disposed in close proximity to both the upper and lower surfaces of said needle member, in all positions thereof.

12. In a magnetic compass, the combination with a needle member and means for pivotally supporting it for free oscillation, of masses of non-magnetic electrically conducting material disposed in close proximity to the upper and lower and end surfaces of said needle member, and substantially completely enclosing the same.

13. In a magnetic compass, the combination with two arcuate needle members concentrically arranged with respect to each other and means for supporting them for free oscillation, of a mass of non-magnetic electrically conducting material disposed on both the inside and outside of said arcuate needle members in close proximity thereto.

KARL MARTIN.